C. G. COWELL.
Axle-Protectors.
No. 165,213. Patented July 6, 1875.
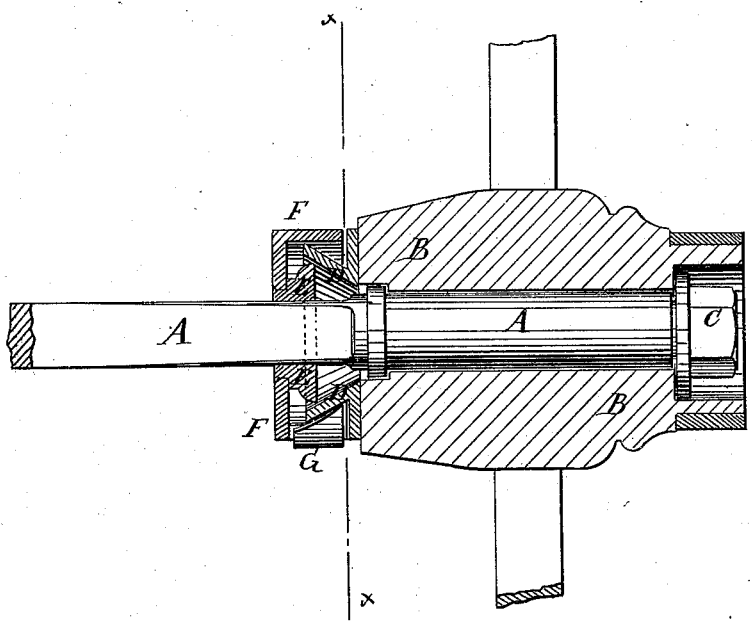
Fig: 1.
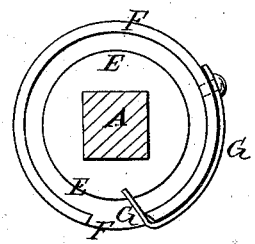
Fig: 2.
WITNESSES:
INVENTOR:
C. G. Cowell, M.D.
BY
ATTORNEYS.

UNITED STATES PATENT OFFICE.

CHARLES G. COWELL, OF PLAINFIELD, ILLINOIS.

IMPROVEMENT IN AXLE-PROTECTORS.

Specification forming part of Letters Patent No. 165,213, dated July 6, 1875; application filed May 22, 1875.

*To all whom it may concern:*

Be it known that I, CHARLES G. COWELL, M. D., of Plainfield, Will county, Illinois, have invented a new and useful Improvement in Axle-Protector, of which the following is a specification:

Figure 1 is a longitudinal section of a hub to which my improved device has been applied, the axle-arm being shown in side view; and Fig. 2 is a detail view of the cap and flaring wheel, the axle being shown in cross-section.

Similar letters of reference indicate corresponding parts.

The object of this invention is to furnish an improved device to prevent the sand, dust, mud, &c., from finding their way into the space between the hub and the axle and wearing the said parts, and which shall be simple in construction, effective in operation, and neat in appearance, giving a finish to the inner end of the hub.

The invention consists in the combination of the flaring sand-band, the flaring wheel, the cap having an opening in the lower part, and the scraper, with each other and with the hub and axle, as hereinafter fully described.

A represents an axle-arm, and B represents the hub of a wheel, which is secured in place upon said axle-arm A by a nut, C, in the usual way. D is the sand-band, which is made flaring and of a less diameter than the hub B, and has an outwardly-projecting ring-flange formed around its inner end, by means of which it is secured to the inner end of the hub B. E is a flaring wheel, the hub of which fits upon and is secured to the axle A, and the rim of which extends into the cavity of the sand-band D. To the hub of the flaring wheel E, or axle A, close to said wheel E, is secured the cap F, the rim of which projects over the flaring wheel E and the flaring sand-band D, so that its edge may be close to the end of the hub B, or to the flange of the sand-band D, attached to the said end. Upon the lower portion of the cap F a portion of its rim is cut away, as shown in Figs. 1 and 2, to receive the end of the scraper G. The scraper G is attached to the rim of the cap F, and its forward end projects into the opening of the said rim, and is so formed as to fit upon the outer surface of the flaring sand-band D, and scrape off any sand, dust, mud, or any other substance that may find its way in between the said cap and the inner end of the hub B.

Any substance that may find its way over the edge of the said band D will be received in the space between the flaring wheel E and the cap F, and will escape through the openings in the lower part of the rim of the said cap F, as shown in Fig. 1.

Having thus described my invention, I claim as new and desire to secure by Letters Patent—

The combination of the flaring sand-band D, the flaring wheel E, the cap F, having an opening in the lower part, and the scraper G, with each other, and with the hub B and axle A, substantially as herein shown and described.

CHARLES G. COWELL, M. D.

Witnesses:
 W. P. HALL,
 CHAS. W. CARRIER.